Feb. 28, 1961   R. H. CALDWELL   2,972,990
BUILT-IN COOKING UNIT
Filed April 21, 1958

INVENTOR
Robert H. Caldwell
BY Lamont Johnston
ATTORNEY

2,972,990
BUILT-IN COOKING UNIT

Robert H. Caldwell, Lookout Mountain, Tenn., assignor to Tennessee Stove Works, Chattanooga, Tenn., a corporation Filed Apr. 21, 1958, Ser. No. 729,857

3 Claims. (Cl. 126—214)

This invention relates to a cooking unit that may be built into a top of a wood, plastic or metal cabinet, counter or any similar supporting structure.

In order to be safe in use, cooking units now known which are designed to be built in are of such great depth that top drawers in cabinets or counters just below the top counter surfaces cannot be used, but must be eliminated. Moreover, in cooking tops heretofore used employing gas as the cooking fuel, the supply of air for combustion of the gaseous fuel has been provided by recessing the valves in the cooking top and taking air in through that recessed section, by raising the cooking top above the counter top and taking air in through a screen located between the cooking top and the counter top, or by providing a front opening in the cabinet through which the air is taken in.

All of these means of supplying air to a gas cooking burner have disadvantages. Taking air in through a front opening in the cabinet requires additional construction in modifying the cabinet and takes up additional space which is valuable in a kitchen. Raising the cooking top above the counter top and taking air in through a screen located between the cooking top and the counter top makes the construction somewhat more expensive, allows food materials spilled onto the cooking top to run into the cabinet and is not particularly attractive in appearance. Recessing the valves in the cooking top and taking air in through that recessed section has the disadvantage that, frequently during cooking, materials boil over or are spilled and naturally flow downward into the recessed section. Such spilled materials are thus very apt to get into the control valves for the gas and interfere with their upper operation or constitute a fire hazard. In addition, such spilled materials getting down into the burner assemblies are very difficult to clean.

One object of this invention is to provide a cooking unit for mounting in a cabinet or counter top which, due to its construction, is of a minimum possible depth, interfering least with the use of the cabinet space below the cooking top.

Another object is to provide a cooking unit for use with a gaseous cooking fuel which has an air supply provided in its compact construction in a raised section of the cooking unit into which spilled foods cannot fall.

A further object of this invention is to provide a cooking unit for a cabinet or counter top which includes a double-walled insulated box for containing one or more burner assemblies, the box being of minimum depth and interfering least with use of the space within the cabinet below the counter top.

Other objects and advantages of the invention will be apparent from the following description, taken in conjunction with the accompanying drawings, in which.

Figure 1:
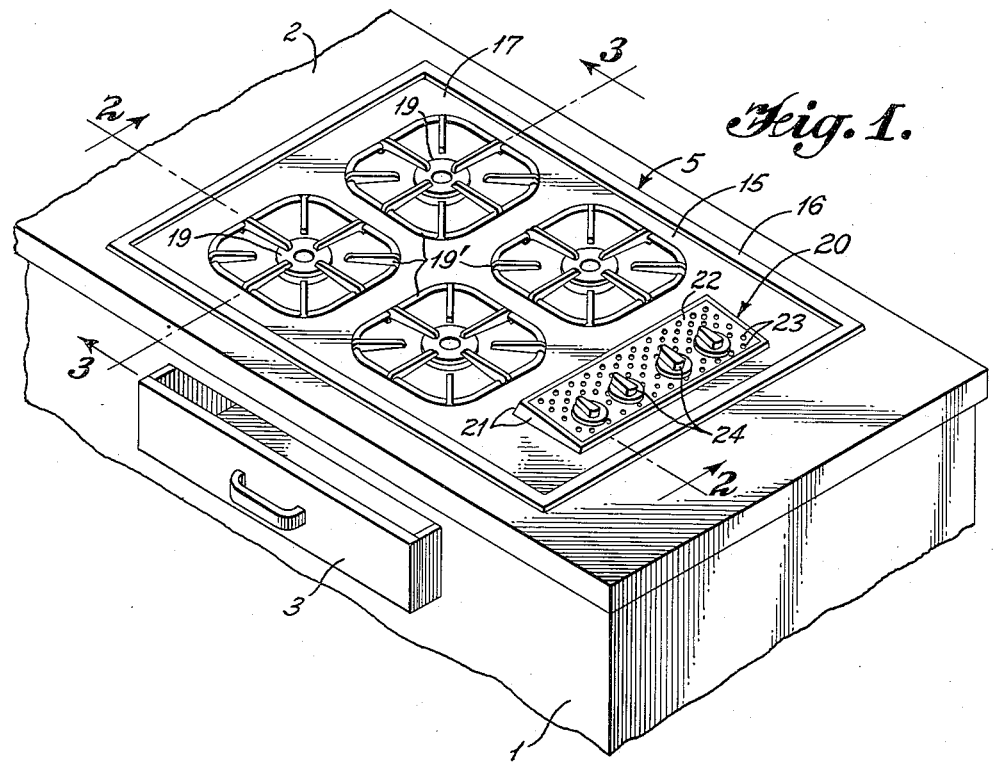
Fig. 1 is a perspective view of a cooking unit made in accordance with this invention installed in a counter top.
Figure 2:
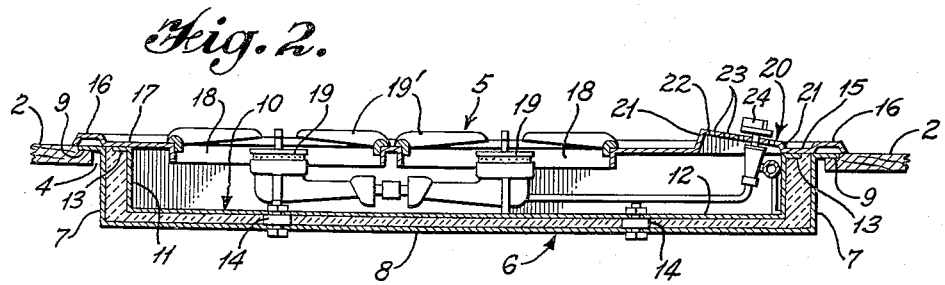
Fig. 2 is a cross sectional view, taken along the line 2—2 of Fig. 1, showing the arrangement of the burner units and control knobs.
Figure 3:
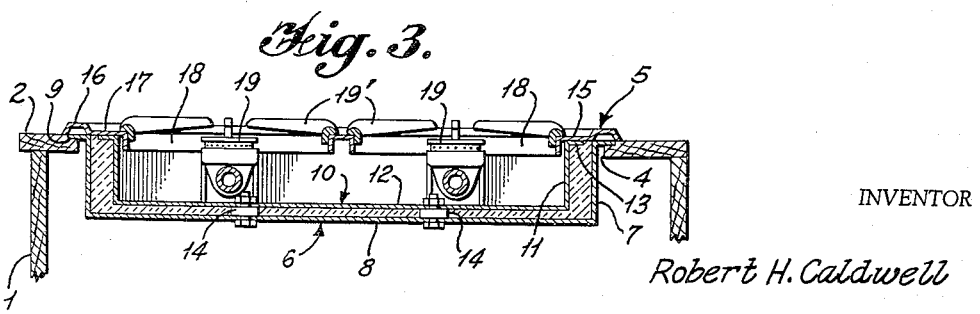
Fig. 3 is a cross sectional view, taken along the line 3—3 of Fig. 1.

In the drawings, there is illustrated a cabinet 1 having a counter top 2 and a drawer 3 therein. Within an opening 4 in the counter top 2 there is placed a cooking unit, generally indicated by the numeral 5.

The cooking unit 5 comprises an outer box 6 having imperforate upstanding or vertical side walls 7 and an imperforate bottom 8. Flanges 9 at the tops of the side walls rest upon and are supported by the counter top 2 all around the edges of the opening 4. The top of the box 6 is open and, nested within it, is a second open-top box 10, having upstanding or vertical side walls 11 and an imperforate bottom 12. Flanges 13 at the tops of the side walls 11 extend outwardly toward, but do not join with, the tops of the side walls 7 of the outer box 6.

The inner box 10 is connected by means of a plurality of spacers, plates or sheet steel angle iron clips 14 to the outer box 6, the spacers 14 being attached in some suitable manner to the inner and outer boxes 6 and 10, as by welding or bolting.

The space between the outer and inner boxes 6 and 10 may either be left empty, in which case the air between the two boxes acts as an insulator, or the space between the boxes may be filled with glass fiber or some other suitable insulating material. In either event, the insulating space between the outer and inner boxes 6 and 10 provides adequate insulation for the heat radiated from the burners in the unit to enable use of a unit which is of the minimum possible depth and therefore interferes least with the use of the cabinet space below the cooking unit. Such a unit has been made and successfully used in which the over-all depth of the unit, as measured from the top of the counter surface to the bottom of the unit, is no more than three inches. Thus, with a unit of such limited depth, there is no interference with the use of a drawer 3 in the cabinet 1.

On top of the cooking unit there is placed a cooking top 15 of sheet metal having a ridged or raised border 16 surrounding the flange 9 on the vertical walls 7 of the outer box 6 and resting upon the counter top 2. Within the outer ridge 16, the cooking top 15 is slightly recessed, as indicated at 17, the raised rim or ridge 16 serving to contain within the cooking unit any food which may be spilled on the cooking top. The recessed portions 17 of the cooking top are substantially flush with and rest upon the tops of the flanges 9 and 13 of the outer and inner boxes 6 and 10. A plurality of openings 18 are provided in the cooking top 15 to receive one or more gas burner units 19 provided with grids 19'.

The cooking top also has a raised section 20 having imperforate upstanding side walls 21 and a top surface 22 which is provided with a large number of perforations 23 and has openings for the reception of control knobs 24 for the control of the burners of the cooking unit. The perforations 23 provide an ample source of primary and secondary air for the gas burners 19, without any of the disadvantages of construction heretofore known. The upstanding walls 21 of the raised section 20 prevent any food which boils over or is spilled onto the cooking top 15 from getting into the control knob 24 or the control valves. Thus, there is no chance of grease collecting in these places which is hard to clean and constitutes a fire hazard.

The spacers 14 which hold the outer and inner boxes 6 and 10 in position relative to each other serve the additional purposes of holding in place the insulation, such as glass fiber, which is used between the two boxes.

By this invention, there is provided a cooking unit using the least possible amount of cabinet space. Its depth of only three inches permits use of a drawer or other use of the space below the cooking unit. In contrast, previously known built-in cooking units have a depth of five to eight inches, occupying a large part of the cabinet space and not permitting the use of drawers below them and near the counter tops.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. A cooking unit comprising an imperforate bottom, side sections and a generally flat top together defining an enclosure, a gas burner in said enclosure, said top having a burner opening therein above said burner, means having an upper edge defining a separate opening in said top for admission of air to said enclosure, said defining edge being in a plane above the general plane of said top and defining a dam surrounding said air admission opening and control means for said burner also on said top.

2. A cooking unit comprising imperforate bottom and side sections, and a generally flat top defining an enclosure, a gas burner in said enclosure, said top having an opening therein for said burner, means having an upper edge defining a separate opening in said top for admission of air to said enclosure, said defining edge being in a plane above the general plane of said top and control means for said burner disposed within said separate opening, at least a portion of the air admission opening lying outside the boundary of said control means, a portion of said edge forming an upstanding imperforate wall between said burner and said control means.

3. A cooking range adapted for counter top installation as a unit comprising an enclosure formed of imperforate side and bottom members together with a substantially flat cooking top, a plurality of gas burners mounted in said enclosure, openings in the top of said burners, each of said openings being provided with a supporting grid, air admission means for said enclosure comprising a section of said top raised above the general plane of the said top and supporting grids and having a plurality of perforations therein, and control means for said burner disposed within said air admission means and extending above said perforated section for less than its total area, said raised section being bounded in part at least by an imperforate upstanding wall lying between said burners and said control means.

References Cited in the file of this patent

UNITED STATES PATENTS

| | | |
|---|---|---|
| 729,233 | Steinhoff | May 26, 1903 |
| 1,524,961 | Asche | Feb. 3, 1925 |
| 1,869,711 | Olsen et al. | Aug. 2, 1932 |
| 1,931,334 | Teller et al. | Oct. 17, 1933 |
| 2,551,759 | Pence | May 8, 1951 |
| 2,609,475 | Sandin et al. | Sept. 2, 1952 |
| 2,712,818 | Chambers | July 12, 1955 |
| 2,773,165 | Konrad | Dec. 4, 1956 |
| 2,806,464 | Williams et al. | Sept. 17, 1957 |
| 2,891,125 | Miller | June 16, 1959 |
| 2,929,453 | Kamin | June 7, 1960 |

OTHER REFERENCES

"Gas Ranges" and "Specifications Data," published by O'Keefe and Merritt (Los Angeles, Calif.), 1956. (Only pages 3 and 4 relied on.)